US012745217B2

(12) United States Patent
Li et al.

(10) Patent No.: US 12,745,217 B2
(45) Date of Patent: Sep. 22, 2026

(54) PAGING MONITORING METHOD, TERMINAL, AND COMPUTER DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 458 days.

(21) Appl. No.: 18/341,581

(22) Filed: Jun. 26, 2023

(65) Prior Publication Data

US 2023/0337184 A1 Oct. 19, 2023

Related U.S. Application Data

(63) Continuation of application No. PCT/CN2020/140960, filed on Dec. 29, 2020.

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC ..... H04W 76/28; H04W 76/27; H04W 68/02; H04W 68/005
See application file for complete search history.

(56) References Cited

U.S. PATENT DOCUMENTS 11,172,447 B2 * 11/2021 Liang .................. H04W 68/005
2018/0014249 A1 * 1/2018 Nagasaka ......... H04W 52/0229
(Continued)

FOREIGN PATENT DOCUMENTS

CN 108307499 A 7/2018
WO 2020118726 A1 6/2020
(Continued)

OTHER PUBLICATIONS

Qualcomm Incorporated, "Page Monitoring in RRC_INACTIVE State with Short eDRX," 3GPP TSG-RAN WG2 Meeting #109e E-meeting R2-2000538 , (Feb. 13, 2020), all pages.
(Continued)

*Primary Examiner* — Dung Hong
(74) *Attorney, Agent, or Firm* — Ladas & Parry, LLP

(57) ABSTRACT

The present application discloses a paging monitoring method, a terminal, and a computer device. The method includes determining a first extended discontinuous reception (eDRX) cycle configured by radio access network (RAN) in response to the terminal being in a radio resource control (RRC) inactive state, wherein the first eDRX cycle is configured to monitor RAN paging and/or core network (CN) paging; and monitoring paging based on the first eDRX cycle. According to the method, the terminal monitors the RAN paging and/or the CN paging on the basis of the same extended discontinuous reception cycle, and when the terminal is in the RRC inactive state, the overlap of monitoring timings of the terminal for the RAN paging and the CN paging is improved, the time for monitoring the paging by the terminal is shortened, and the resource consumption of the terminal is reduced.

20 Claims, 4 Drawing Sheets

(56) References Cited

U.S. PATENT DOCUMENTS

| | | | | |
|---|---|---|---|---|
| 2018/0176883 | A1* | 6/2018 | Fujishiro | H04W 52/0206 |
| 2018/0279256 | A1* | 9/2018 | Wu | H04W 68/02 |
| 2018/0352604 | A1* | 12/2018 | Vajapeyam | H04W 72/0446 |
| 2020/0008042 | A1 | 1/2020 | Sugiyama | |
| 2023/0224800 | A1* | 7/2023 | Murray | H04W 48/12<br>370/329 |
| 2024/0057210 | A1* | 2/2024 | Li | H04W 52/0216 |
| 2025/0267759 | A1* | 8/2025 | Vogedes | H04W 76/28 |

FOREIGN PATENT DOCUMENTS

| | | | | |
|---|---|---|---|---|
| WO | WO-2022077315 | A1 * | 4/2022 | H04W 52/0235 |
| WO | 2022141080 | A1 | 7/2022 | |

OTHER PUBLICATIONS

Huawei et al., "Discussion on Paging of RRC_INACTIVE for eMTC Connected to 5GC," 3GPP TSG-RAN WG2 Meeting #109-e Electronic meeting R2-2000645 , (Feb. 14, 2020), all pages.

ZTE, "Report from Break-out session on R16 eMIMO, CLI, PRN, RACS and R17 NTN and REDCAP," 3GPP TSG-RAN WG2 Meeting #111 electronic R2-2008122 , Online, Aug. 17-28, 2020, all pages.

ZTE, "Report from Break-out session on R16 eMIMO, CLI, PRN, RACS and R17 NTN and REDCAP," 3GPP TSG-RAN WG2 Meeting #112 electronic R2-2010702 , Online, Nov. 2-13, 2020, all pages.

International Search Report and written opinion, International Application No. PCT/CN2020/140960, mailed Jun. 23, 2021.

ZTE Corporation et al:"Introduction of eDRX for redcap", 3GPP TSG-RAN WG2 Meeting #111 electronic; R2-2006905, Aug. 7, 2020(7 pages).

European Search Report from the corresponding European Patent Application No. 20967428.2, mailed Feb. 2, 2024 (11 pages).

First Office Action of the European patent application No. 20967428.2, issued on Nov. 10, 2025.

Second Office Action from the corresponding European patent application No. 20967428.2, issued on Jul. 24, 2026.

* cited by examiner

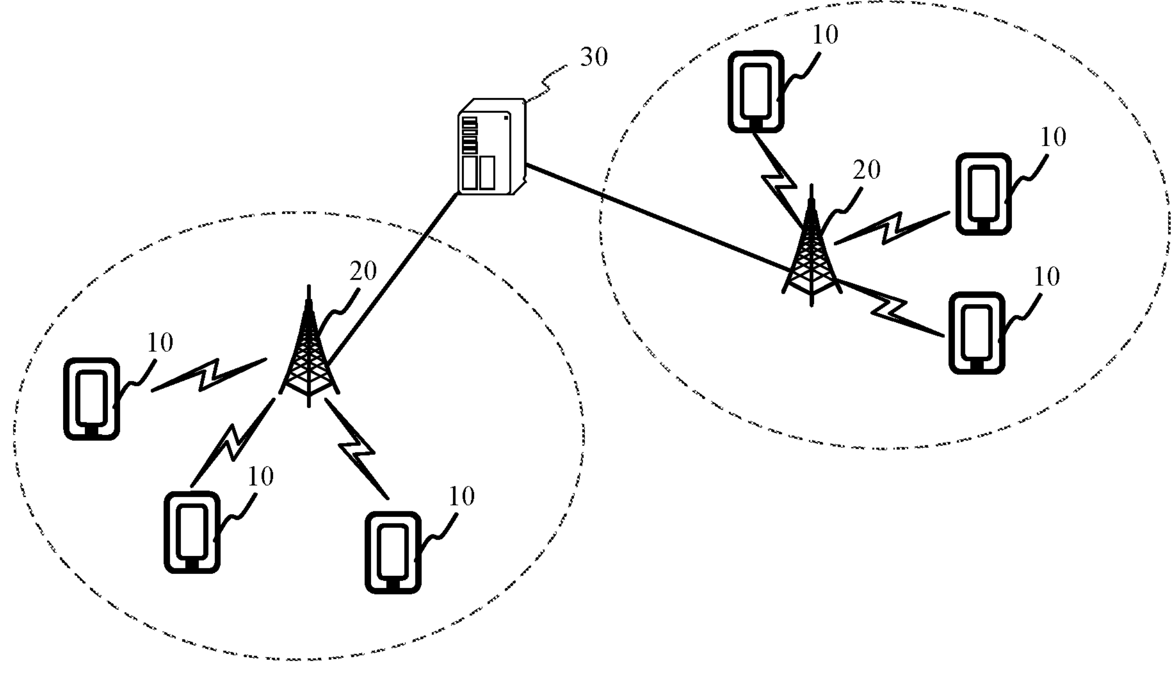

Determining a first extended discontinuous reception cycle configured by a radio access network (RAN) in response to the terminal in a radio resource control (RRC) inactive state, wherein the first extended discontinuous reception cycle is configured to monitor a RAN paging and/or a core network (CN) paging

202

Monitoring a paging based on the first extended discontinuous reception cycle

FIG. 2

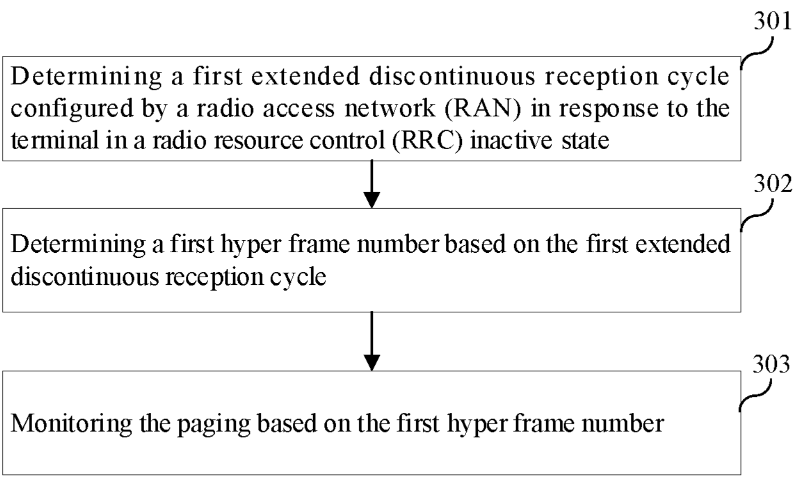
FIG. 3
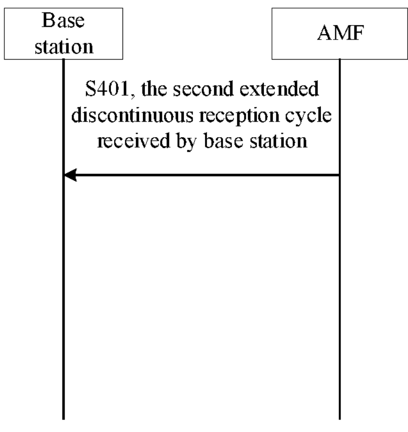
FIG. 4
Base station
AMF
S501, the second extended discontinuous reception cycle sent by AMF
FIG. 5

PAGING MONITORING METHOD, TERMINAL, AND COMPUTER DEVICE

CROSS REFERENCE TO RELATED APPLICATIONS

The present disclosure is a continuation of International Patent Application No. PCT/CN2020/140960, filed on Dec. 29, 2020, the content of which is herein incorporated by reference in its entirety.

TECHNICAL FIELD

The present disclosure relates to the technical field of communication, in particular to a paging monitoring method, a terminal and a computer device.

BACKGROUND

In the 5th-Generation (5G) mobile communication network, Radio Resource Control (RRC) inactive state (RRC_INACTIVE) is introduced based on energy-saving considerations.

When downlink data needs to be sent to a User Equipment (UE) in an available RRC_IDEL, the terminal receives paging from the gNB. Upon receiving the paging, the UE in the RRC_IDEL state may initiate an RRC connection establishing a process to receive the call. In order to receive the paging from the base station, the UE in RRC_IDLE state monitors the Physical Downlink Control Channel (PDCCH) scrambled with P-RNTI. The paging supports, Discontinuous Reception (DRX), which allows the UE in the RRC_IDLE state to receive the paging only during predefined timing cycles while maintaining a "sleep" state during other times, thereby reducing power consumption and extending the UE's battery life.

SUMMARY OF THE DISCLOSURE

In a first aspect, some embodiments in the present disclosure provide a paging monitoring method, applied to a terminal, including: determining, a first extended discontinuous reception (eDRX) cycle configured by radio access network (RAN) in response to the terminal in a radio resource control (RRC) inactive state, wherein the first eDRX cycle is configured to monitor a RAN paging and/or a core network (CN) paging; monitoring, paging based on the first eDRX cycle.

In a second aspect, some embodiments in the present disclosure provide a terminal, including a processor, a memory, and a transceiver, wherein the processor is applied to determining a first extended discontinuous reception (eDRX) cycle configured by radio access network (RAN) in response to the terminal being in a radio resource control (RRC) inactive state; the first eDRX cycle is configured to monitor RAN paging and/or core network (CN) paging; the transceiver is applied to monitoring paging based on the first eDRX cycle.

In a third aspect, some embodiments in the present disclosure provide a computer device, including a processor, a memory, and a transceiver, wherein in response to the processor, the memory and the transceiver applied in a base station, the transceiver is applied to receiving a second extended discontinuous reception (eDRX) cycle sent by an access and mobility management function (AMF) through an initial context setup request message and/or a path switch request acknowledge message, wherein the second eDRX cycle is applied to paging monitored by a terminal; or in response to the processor, the memory and the transceiver applied in an access and mobility management function (AMF), the transceiver is applied to sending a second extended discontinuous reception (eDRX) cycle to a base station through an initial context setup request message and/or a path switch request acknowledge message, wherein the second eDRX cycle is applied to paging monitored by a terminal.

BRIEF DESCRIPTION OF THE DRAWINGS

FIG. 1 is a network structural schematic view of a communication system provided in some embodiments of the present disclosure.

FIG. 2 is a flow chart of a paging monitoring method provided in some embodiments of the present disclosure.

FIG. 3 is a flow chart of a paging monitoring method provided in some embodiments of the present disclosure.

FIG. 4 is a flow chart of a paging monitoring method provided in some exemplary embodiments of the present disclosure.

FIG. 5 is a flow chart of a paging monitoring method provided in some exemplary embodiments of the present disclosure.

DETAILED DESCRIPTION

Figure 6:
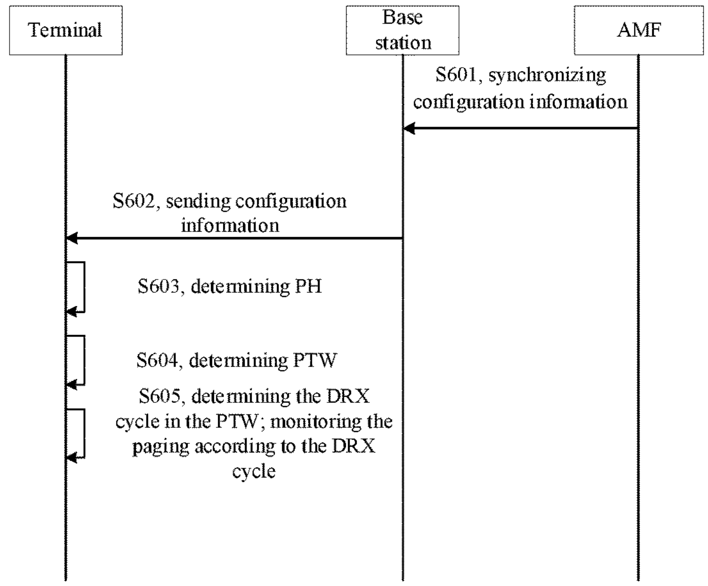
FIG. 6 is a flow chart of a paging monitoring method provided in some exemplary embodiments of the present disclosure.

In order to describe the purpose, technical solutions, and advantages in the embodiments of the disclosure clearly, the technical solutions in the embodiments of the present disclosure will be further completely described below in conjunction with the accompanying drawings.

The network infrastructure and service scenarios described in the embodiments of the present disclosure are intended to provide a clearer understanding of the technical solutions and do not constitute limitations on the technical solutions provided in the embodiments of the present disclosure. It will be understood by those skilled in the art that, as network infrastructures evolve and new service scenarios emerge, the technical solutions provided in the embodiments of the present disclosure are equally applicable to similar technical problems.

The quantity of terminals 10 is generally multiple, and one or more terminals 10 may be distributed in each cell managed by a base station 20. Terminal 10 may include various handheld devices, vehicle-mounted devices, wearable devices, computing devices, or other processing devices with wireless communication capabilities, as well as various forms of user equipment (UE), mobile stations (MS), terminal devices, etc. For convenient description, all such devices mentioned herein are collectively referred to as "terminals" in some embodiments of the present disclosure.

The base station 20 is a device deployed in the access network to provide wireless communication functions to terminal 10. The base station 20 may include various forms of macro base stations, micro base stations, relay stations, access points, etc. In systems using different wireless access technologies, the device with base station functions may be named differently. For example, in a 5G New Radio (NR) system, it may be called gNodeB or gNB. The name "base station" may change as communication technology evolves. For convenience, all devices providing wireless communication functions to terminal 10 mentioned herein are collectively referred to as "base station" in the embodiments of the present disclosure.

Access and Mobility Management Function (AMF) device 30 is a type of device deployed in the Core Network (CN) of the network infrastructure that receives all connection and session-related information and is responsible for handling connection and mobility management tasks.

Optionally, other network devices such as Central Network Control (CNC), Session Management Function (SMF), or User Plane Function (UPF) devices, which are not shown in FIG. 1, may also be included in the above network infrastructure.

The "5G NR system" described in this disclosure may also be referred to as the 5G system or NR system, but those skilled in the art will understand its meaning. The technical solution described in the embodiments of the disclosure can be applied to the 5G NR system or subsequently evolved systems of the 5G NR.

Currently, with people's pursuit of speed, latency, high mobility, energy efficiency, and the diversity and complexity of service in the future life, the 3GPP international standard organization has begun to develop 5G. The main application scenarios of 5G are enhanced mobile broadband (eMBB), ultra-reliable low-latency communication (URLLC), and massive machine-type communication (mMTC).

On one hand, eMBB still aims to provide users with multimedia content, services, and data, and its demand is growing rapidly. On the other hand, since eMBB may be deployed in different scenarios such as indoor, urban, rural, etc., there are significant differences in its capabilities and requirements. Therefore, a detailed analysis must be carried out in conjunction with specific deployment scenarios. Typical applications of URLLC include industrial automation, power automation, remote medical operations (surgery), and traffic safety assurance. The typical characteristics of mMTC include high connection density, small data volume, delay-insensitive service, low-cost and long-life modules, etc.

NR can also be deployed independently. In the 5G network environment, to reduce the air interface signaling and quickly restore wireless connections and data services, a new RRC state is defined, namely the RRC_INACTIVE state. This state is different from the RRC_IDLE and RRC ACTIVE states.

RRC_IDLE: Mobility is based on UE's cell selection and reselection, paging is initiated by CN, and the paging area is configured by CN. There is no UE AS context on the base station side. There is no RRC connection.

RRC_CONNECTED: There is an RRC connection, and there is a UE AS context between the base station and the UE. The network side is informed of the UE's location at the specific cell level. Mobility is controlled by the network side. Unicast data can be transmitted between the UE and the base station.

RRC_INACTIVE: Mobility is based on UE's cell selection and reselection. There is a connection between CN and NR. The UE AS context exists on a certain base station. Paging is triggered by RAN, and the paging area based on RAN is managed by RAN. The network side is informed of the UE's location at the paging area level based on RAN.

In the 5G NR paging mechanism, the main function of paging is to enable the network to page the UE in its RRC IDLE or RRC INACTIVE state with a paging message, or to notify the UE of system message changes or earthquake/tsunami public warning messages with a short message (for all RRC states of the UE, including the connected state).

Paging includes the Physical Downlink Control Channel (PDCCH) scrambled by Paging Radio Network Temporary Identifier (P-RNTI) and the Physical Downlink Shared Channel (PDSCH) scheduled by the PDCCH. The paging message is transmitted on the PDSCH, and the short message is 8 bits in the PDCCH.

For a UE in RRC_IDLE or RRC_INACTIVE state. Since there is no other data communication between the UE and the network, the UE can save power by non-continuously monitoring the paging channel, i.e., using the paging Discontinuous Reception (DRX) mechanism. Under the Paging DRX mechanism, the UE only needs to monitor the paging during one PO (Paging Occasion) within each DRX cycle. A PO is a series of PDCCH monitoring timings, which can consist of multiple time slots. There is also a concept of PF (Paging Frame), which refers to a wireless frame (fixed at 10 ms) that may contain multiple POs or the starting positions of multiple POs.

A paging DRX cycle is determined jointly by a common cycle in a broadcast system and a dedicated cycle configured in a high-level signaling (NAS signaling). The UE takes the minimum cycle of the two as the paging cycle. From the network's perspective, the paging DRX cycle may have multiple POs, and the UE's monitoring position for a PO in a paging DRX is related to the UE's Identity Document (ID). The specific determination method of a UE's PF and PO in a paging DRX is as follows:

The SFN (System Frame Number) of PF is determined by the following functions:

$$(SFN+PF\_offset) \bmod T=(T \text{ div } N)*(UE\_ID \bmod N);$$

The number Index (i_s) of PO located in a PF is determined by the following functions:

$$i\_s=\text{floor}(UE\_ID/N) \bmod Ns;$$

The explanation of some parameters above is below:

T: DRX cycle for the UE to receive paging. The network will broadcast a default DRX cycle ( ) When the RRC/higher level has configured a UE specific cycle for the UE, the minimum of the DRX cycle broadcast by the network and the UE specific DRX cycle configured by the RRC/higher level will be the DRX cycle of the UE. If the RRC/high level does not configure the UE specific DRX cycle for the UE, the DRX cycle broadcast by the network will be used as the DRX cycle of the UE.

N: the number of PFs contained in a DRX cycle

Ns: the number of POs contained in a PF

PF offset: used to determine a time domain offset of the PF.

Div: integer division function, used to divide two integers and return the quotient.

Mod: the remainder function, used to return the remainder of the division of two numbers.

Floor: down to the integer function, which is acquiring the number by the number axis on the left side of the closest required value, that is, the largest integer value that is not greater than the required value.

UE_ID: 5G-S-TMSI (Temporary Mobile Subscriber Identity) mod 1024.

For a UE, according to the above equation, the position of the PF in a paging DRX cycle and the index of the PO may be acquired. In the standard TS 38.304, the PO is composed of multiple PDCCH monitoring timings (monitoring times). A PO contains X PDCCH monitoring timing, X is equal to the actual number of Single Side Bands (SSBs) sent for broadcast in the Management Information Base (MIB).

After the UE acquires the index (number) of the PF, PO, and the number of PDCCH monitoring timings in the PO, it only needs to acquire the starting position of the first PDCCH monitoring timing of the PO through the relevant configuration parameters, which may be acquired through the high-level signaling configuration, or based on the PO index. The UE will blindly check the paging messages according to the determined PO.

Considering that for the type of NB-IoT and eMTC terminals, the service type is single and the service activity is very low, these terminals are in the non-connected state most of the time. Further, considering that the services of these terminals are not sensitive to the delay requirements, to further save power in the non-connected state, an extended Discontinuous Reception (eDRX) mechanism is introduced in LTE for these terminals to support a greater paging cycle, i.e., the paging cycle is greater than 256 SFNs.

For the UE configured with eDRX, if the eDRX cycle of the UE is less than one H-SFN, e.g., the eDRX cycle of the UE is 512, the UE calculates its PO based on T=512. If the eDRX cycle of the UE is greater than or equal to one H-SFN, the UE monitors the P-RNTI scrambled PDCCH. Paging timing window (PTW) is exclusive to the UE. Based on the paging hyper frame (PH), a start time point PTW_start and an end time point PTW_end located within the PH is determined.

The PH is an H-SFN satisfying the following conditions:

$$H\text{-}SFN \bmod T_{eDRX,H} = (UE\_ID\_H \bmod T_{eDRX,H});$$

wherein, UE_ID_H is based on a Hash; $T_{eDRX,H}$ is an eDRX cycle in a hyper frame, configured by AMF.

PTW_start is a starting radio frame number, which is an SFN satisfying the flowing conditions:

$$SFN = 256 * i_{eDRX};$$

$$i_{eDRX} = \text{floor}(UE\_ID\_H / T_{eDRX,H}) \bmod 4$$

PTW_end is an ending radio frame number, which is an SFN satisfying the flowing conditions:

$$SFN = (PTW\_\text{start} + L * 100 - 1) \bmod 1024;$$

wherein, L is a window length of PTW, configured by AMF.

Based on the paging mechanism, some embodiments of the present disclosure provide feasible solutions for how to implement paging for monitoring a CN as well as the ratio access network (RAN) in an RRC_INACTIVE state.

Referring to FIG. 2, FIG. 2 is a flow chart of a paging monitoring method provided in some embodiments of the present disclosure. The method may be performed by a terminal, wherein such terminal as described above may be a terminal 10 in the network infrastructure shown in FIG. 1. The method may include the following steps.

Step 201, a first extended discontinuous reception cycle configured by a radio access network, RAN, is determined, in response to the terminal in a radio resource control, RRC, inactive state, wherein the first extended discontinuous reception cycle is configured to monitor a RAN paging and/or a CN paging.

In step 201, the first extended discontinuous reception cycle is an eDRX cycle configured for the radio access network RAN.

Step 202, paging is monitored based on the first extended discontinuous reception cycle.

In step 202, the terminal may monitor the paging according to the first extended discontinuous reception cycle, and the monitoring target of the paging is the RAN paging and/or the CN paging.

In summary, based on the solution provided in the embodiments of the present disclosure, the eDRX cycle configured by a radio access network RAN is determined, and the paging is monitored based on the eDRX cycle, when the terminal is in the RRC inactive state. When the terminal monitors the paging in the RRC inactive state, the monitoring targets include CN paging and RAN paging. With the above solution, the terminal monitors RAN paging and/or CN paging based on the same extended discontinuous reception cycle. When the terminal is in the RRC inactive state, the overlap of the terminal's monitoring timing to RAN paging and CN paging is improved, the terminal's monitoring time of paging is reduced, and the terminal's resource consumption is reduced.

Referring to FIG. 3, FIG. 3 is a flow chart of a paging monitoring method provided in some embodiments of the present disclosure. The method may be performed by a terminal, a base station, and an AMF in a CN. The method may include the following steps:

Step 301, a first extended discontinuous reception cycle configured by a radio access network, RAN, is determined, in response to the terminal in a radio resource control, RRC, inactive state.

In some embodiments, the first extended discontinuous reception cycle is a first extended discontinuous reception cycle configured by a gNB in the radio access network RAN.

That is, the first extended discontinuous reception cycle may be an eDRX cycle configured by the gNB in the RAN.

Step 302, a first hyper system frame number (H-SFN) is determined based on the first extended discontinuous reception cycle.

In step 302, the first H-SFN is an H-SFN PH acquired based on the first extended discontinuous reception cycle. The terminal may monitor the paging within the PTW corresponding to the first H-SFN based on the monitoring cycle corresponding to the first H-SFN.

In some embodiments, the first H-SFN is determined based on the first extended discontinuous reception cycle and the device identification.

For example, the PH corresponding to the first H-SFN is an H-SFN satisfying the following conditions:

$$H\text{-}SFN \bmod T_{eDRX,H,RAN} = (UE\_ID\_H \bmod T_{eDRX,H,RAN});$$

wherein, UE_ID_H is based on a Hash; $T_{eDRX,H,RAN}$ is an eDRX cycle in a hyper frame, configured by gNB.

That is, the UE_ID_H is the device identification corresponding to the terminal. $T_{eDRX,H,RAN}$ is the first extended discontinuous reception cycle configured by RAN. According to the UE_ID_H and the remainder function of $T_{eDRX,}$ $_{H,RAN}$, and the relationship between H-SFN and the remainder function of $T_{eDRX,H,RAN}$, the device identification and the first H-SFN corresponding to the first extended discontinuous reception cycle may be determined.

Step 303, the paging is monitored based on the first H-SFN.

In some embodiments, a second extended discontinuous reception cycle configured by the AMF is determined; a second H-SFN based on the second extended discontinuous reception cycle is determined; and the paging based on the first H-SFN and the second H-SFN is monitored.

Among them, the second extended discontinuous reception cycle configured by the AMF is an eDRX cycle configured by the AMF.

In some embodiments, the second H-SFN is determined based on the second extended discontinuous reception cycle and the device identification.

For example, the PH corresponds to the second H-SFN is an H-SFN satisfying the following conditions:

$$H\text{-}SFN \bmod T_{eDRX,H}=(UE\_ID\_H \bmod T_{eDRX,H});$$

wherein the UE_ID_H is based on a Hash; $T_{eDRX,H}$ is an eDRX cycle in a hyper frame, configured by AMF in CN.

That is, the UE_ID_H is the device identification corresponding to the terminal. T eDRX,H is the second extended discontinuous reception cycle configured by AMF. According to the UE_ID_H and the remainder function of $T_{eDRX,H}$, and the relationship between H-SFN and the remainder function of $T_{eDRX,H}$, the device identification and the second H-SFN corresponding to the second extended discontinuous reception cycle may be determined.

In some embodiments, a first paging monitoring cycle corresponding to the first paging occasion is determined based on this first H-SFN and this second H-SFN; and the paging is monitored based on the first paging monitoring cycle corresponding to the first paging occasion.

In some embodiments, a first paging occasion is any one radio frame in any one hyper frame when the terminal monitors the paging. The terminal may acquire both an H-SFN corresponding to the first paging occasion and a radio frame number corresponding to the first paging occasion when it acquires the first paging occasion.

The terminal needs to monitor the paging according to the first H-SFN and also needs to monitor the paging according to the second H-SFN. The first H-SFN corresponds to the eDRX cycle configured by the gNB in the RAN, i.e. the terminal may monitor the RAN paging according to the eDRX cycle. The second H-SFN corresponds to the eDRX cycle configured by the AMF in the CN, i.e. the terminal may monitor the RAN paging according to the eDRX cycle. The second H-SFN corresponds to the eDRX cycle configured by the AMF in the CN, i.e., the terminal may monitor the CN paging according to the eDRX cycle. Therefore, according to a first paging occasion of paging monitored by a terminal, the terminal may determine the first paging monitoring cycle corresponding to the first paging occasion. According to the first paging monitoring cycle corresponding to the first paging occasion, the terminal monitors the paging.

In some embodiments, the first paging monitoring cycle is determined based on at least one of a RAN paging cycle, a device characteristic cycle, and a default paging cycle, in response to the first H-SFN and the second H-SFN both including the first paging occasion.

When the first H-SFN and the second H-SFN both include the first paging occasion, that is, when the H-SFN corresponding to the first paging occasion corresponds to the first H-SFN and the second H-SFN, the terminal's monitoring target for paging includes RAN paging and CN paging, the terminal may use at least one of RAN paging cycle, UE specific DRX and default paging cycle to determine the DRX cycle for monitoring to paging.

Among them, the RAN paging cycle needs to be configured by the base station to the terminal through RRC signaling, and the UE specific DRX needs to be configured by the high level to the terminal. Therefore, the RAN paging cycle and UE specific DRX may or may not be configured in the terminal.

In some embodiments, the first paging monitoring cycle is determined based on the minimum of at least one of a RAN paging cycle, a device characteristic cycle, and a default paging cycle, in response to the first H-SFN and the second H-SFN both including the first paging occasion.

In response to both the first H-SFN and the second H-SFN including the first paging occasion, when the terminal monitors the paging at the first paging occasion, the monitoring target may include the RAN paging and the CN paging. At this time, the minimum of the monitoring cycle corresponding to the RAN paging and the CN paging is determined to be the first paging monitoring cycle corresponding to the first paging occasion. In this case, the minimum of the corresponding monitoring cycle in RAN paging and CN paging may be determined as the first paging monitoring cycle corresponding to the first paging time, to ensure that both RAN paging and CN paging may be monitored normally.

In some embodiments, a RAN paging cycle is determined as the first paging monitoring cycle, in response to the first H-SFN including the first paging occasion and the second H-SFN excluding the first paging occasion.

When the first H-SFN includes the first paging occasion and the second H-SFN does not include the first paging occasion, i.e., when the terminal monitors the paging at the first paging occasion, the monitoring target is the RAN paging, and the monitoring cycle corresponding to the RAN paging is determined directly as the first paging monitoring cycle.

In some embodiments, a first paging timing window is determined based on a second extended discontinuous reception cycle; and the paging is monitored in the first PTW based on the first paging monitoring cycle.

When the RAN paging is monitored to using the H-SFN H-SFN and PTW scheme, the first PTW may be determined based on the second extended discontinuous reception cycle. The paging is monitored in the first PTW based on the first paging monitoring cycle.

In some embodiments, a window length of the first PTW configured by the AMF is determined; a starting radio frame number of the first PTW is determined based on the second extended discontinuous reception cycle; and an ending radio frame number of the first PTW is determined based on the starting radio frame number of the first PTW and the window length of the first PTW.

In some embodiments, the starting radio frame number of the first PTW is determined based on the second extended discontinuous reception cycle and a device identification corresponding to the terminal.

For example, the first PTW may be determined as follows:

PTW_start is the starting radio frame number of the PTW, which is also an SFN satisfying the following conditions:

$$SFN=256*i_{eDRX};$$

$i_{eDRX}$=floor(UE_ID_H/$T_{eDRX,H}$) mod 4, $T_{eDRX,H}$ is an eDRX cycle in a hyper frame, configured by the AMF.

PTW_end is the ending radio frame number of the PTW, which is also an SFN satisfying the following conditions:

SFN=(PTW_start+L*100−1) mod 1024, where L is the window length of the PTW, configured by the AMF.

In some embodiments, a minimum of at least one of a device characteristic cycle and a default paging cycle is determined as the first paging monitoring cycle, in response to the first H-SFN excluding the first paging occasion and the second H-SFN including the first paging occasion.

When the first H-SFN does not include the first paging occasion and the second H-SFN includes the first paging occasion, i.e. when the terminal monitors the CN paging at the first paging occasion, the minimum of the UE specific DRX (i.e. device characteristic cycle configured by a high level) and the default paging cycle (i.e. default paging cycle) is used as the first paging monitoring cycle. The minimum of the UE specific DRX (i.e., device characteristic cycle configured by high level) and default paging cycle (i.e., default paging cycle) is used as the DRX cycle monitoring paging.

In some embodiments, a second PTW is determined based on the second extended discontinuous reception cycle; and the paging is monitored in the second PTW based on the first paging monitoring cycle.

In some embodiments, a window length of the second PTW configured by the AMF is determined; a starting radio frame number of the second PTW is determined based on the second extended discontinuous reception cycle; and an ending radio frame number of the second PTW is determined based on the starting radio frame number of the second PTW and the window length of the second PTW.

In some embodiments, the starting radio frame number of the second PTW is determined based on the second extended discontinuous reception cycle and a device identification corresponding to the terminal.

For example, the first PTW may be determined as follows:

PTW_start is the starting radio frame number of the PTW, which is also an SFN satisfying the following conditions:

$$SFN=256*i_{eDRX}$$

$i_{eDRX}$=floor (UE_ID_H/$T_{eDRX,H}$) mod 4, $T_{eDRX,H}$ is an eDRX cycle in a hyper frame, configured by the AMF.

PTW_end the ending radio frame number of the PTW, which is also an SFN satisfying the following conditions:

$$SFN=(PTW\_start+L*100-1) \bmod 1024;$$

wherein, L is the window length of the PTW, configured by the AMF.

Among them, both the second PTW and the first PTW are determined based on the second extended discontinuous reception cycle and the corresponding device identification of the terminal, i.e., the window length of the second PTW and the first PTW are the same, and the starting radio frame within the hyper frame of the second PTW and the first PTW is also the same. Therefore, when both the first H-SFN and the second H-SFN include the first paging occasion, the first PTW, and the second PTW overlap. In the overlap, the terminal may monitor paging in the first PTW according that when both the first H-SFN and the second H-SFN include the first paging occasion determined by the first paging monitoring cycle. That is, when both the first H-SFN and the second H-SFN include the first paging occasion, in the hyper frame corresponding to the first paging occasion, the monitoring PTWs of the CN paging target and the RAN paging target overlap, so that the terminal may monitor both monitoring targets at the same time within the shortest monitoring timing, which reduces the resource consumption of the terminal.

When the first H-SFN includes the first paging occasion and the second H-SFN does not include the first paging occasion, the paging target of the hyper frame corresponding to the first paging occasion is RAN paging. At this time, the paging is monitored in the first PTW of the hyper frame. When the first H-SFN does not include the first paging occasion and the second H-SFN includes the first paging occasion, the paging target of the hyper frame corresponding to the first paging occasion is CN paging. At this time, the paging is monitored in the second PTW of the hyper frame.

In some embodiments, a third PTW is determined based on the first extended discontinuous reception cycle; and the paging is monitored based on the first H-SFN and the third PTW.

Wherein, the eDRX configured by the AMF is not configured, or the configured eDRX is less than one hyper frame (i.e. 1024 wireless frames for 10.24 seconds), the third PTW may also be determined based on the RAN configured eDRX.

In some embodiments, a second paging monitoring cycle is determined corresponding to a second paging timing based on the first H-SFN and the third PTW; and the paging is monitored based on the second paging monitoring cycle.

When the terminal monitors the paging at the second paging timing, the second paging monitoring cycle corresponding to the second paging timing can be determined based on the first H-SFN and the third PTW.

In some embodiments, the second paging monitoring cycle is determined based on at least one of a RAN paging cycle, a device characteristic cycle, and a default paging cycle, in response to the first H-SFN and the third PTW both including the second paging occasion.

When the second paging occasion is during the third PTW in the first H-SFN, the monitoring target corresponding to the second paging occasion includes at least the RAN paging. When the eDRX configured by the AMF corresponding to the CN paging is not configured, or when the configured eDRX is less than one hyper frame, i.e., when the PTW is not configured in the CN paging, the CN paging may monitor the paging during the whole hyper frame according to at least one of the device characteristic cycle and the default paging cycle.

Thus, during the third PTW in the hyper frame corresponding to the second paging occasion, the second paging monitoring cycle is determined based on at least one of the RAN paging cycles, the device characteristic cycle, and the default paging cycle. At the same time, the paging is monitored during the third PTW based on the second paging monitoring cycle.

In some embodiments, the second paging monitoring cycle is determined based on the minimum of at least one of a RAN paging cycle, a device characteristic cycle, and a default paging cycle, in response to the first H-SFN and the third PTW both including the second paging occasion.

In some embodiments, a window length of the third PTW configured by a base station is acquired; a starting radio frame number of the third PTW is determined based on the first extended discontinuous reception cycle; an ending radio frame number of the third PTW is determined based on the starting radio frame number of the third PTW and the window length of the third PTW.

In some embodiments, the starting radio frame number of the third PTW is determined based on the first extended discontinuous reception cycle and a device identification corresponding to the terminal.

For example, for RAN paging eDRX, if PTW and PH need to be used under the RAN eDRX cycle configuration, the PH and PTW are calculated as follows:

PH is an H-SFN satisfying the following conditions:

$$H\text{-}SFN \bmod T_{eDRX,H,RAN}=(UE\_ID\_H \bmod T_{eDRX,H,RAN});$$

wherein, UE_ID_H is based on a Hash; $T_{eDRX,H,RAN}$ is an eDRX cycle in a hyper frame, configured by gNB.

PTW_start is the starting radio frame number of the PTW, which is also an SFN satisfying the following conditions:

$$SFN=256*i_{eDRX}$$

$$i_{eDRX}=\text{floor}(UE\_ID\_H/T_{eDRX,H}) \bmod 4;$$

PTW_end is the ending radio frame number of the PTW, which is also an SFN satisfying the following conditions:

$$SFN=(PTW\_\text{start}+L1*100-1) \bmod 1024;$$

wherein, L is the window length of the PTW, configured by the gNB in RAN. The configuration condition of the gNB configuring the window length of the PTW is that the AMF in the CN is not configured with a window length of a PTW.

In some embodiments, the second extended discontinuous reception cycle is determined as the second paging monitoring cycle, in response to at least one of the first H-SFN and the third PTW excluding the second paging occasion and the second extended discontinuous reception cycle configured by the AMF less than a cycle threshold.

In some embodiments, the second paging monitoring cycle is determined based on at least one of a device characteristic cycle and a default paging cycle, in response to at least one of the first H-SFN and the third PTW excluding the second paging occasion and the second extended discontinuous reception cycle not configured by the AMF In some embodiments, the second paging monitoring cycle is determined based on the minimum of at least one of a device characteristic cycle and a default paging cycle, in response to at least one of the first H-SFN and the third PTW excluding the second paging occasion and the second extended discontinuous reception cycle not configured by the AMF.

When the second paging occasion is not included in the first H-SFN or is not included in the third PTW, i.e., the monitoring target corresponding to the second paging monitoring target does not include RAN paging while the CN paging is not configured with a PTW. Thus, the terminal may monitor through the monitoring cycle corresponding to the CN paging at the second paging occasion.

When the AMF is configured with a second extended discontinuous reception cycle less than the cycle threshold, the second extended discontinuous reception cycle is directly used as the second paging monitoring cycle. When the AMF is not configured with a second extended discontinuous reception cycle, the terminal uses the minimum of at least one of the device characteristic cycle (if has been configured at a high level) and the default paging cycle as the second paging monitoring cycle. When the device characteristic cycle is not configured at a high level and the AMF is not configured with a second extended discontinuous reception cycle, the terminal directly uses this default paging cycle as the second paging monitoring cycle.

In summary, the solution provided in some embodiments of the present disclosure determines the eDRX cycle configured by the RAN when the terminal is in the RRC inactive state. The terminal monitors paging based on the eDRX cycle. In the RRC inactive state, when the terminal monitors the paging, the monitoring targets include CN paging and RAN paging. With the above solution, the terminal monitors RAN paging and/or CN paging based on the same extended discontinuous reception cycle. When the terminal is in the RRC inactive state, the overlap of the terminal's monitoring timing to RAN paging and CN paging is improved, the terminal's monitoring time to paging is reduced, and the terminal's resource consumption is reduced.

Referring to FIG. 4, FIG. 4 is a flow chart of a paging monitoring method provided in some exemplary embodiments of the present disclosure. The paging monitoring method is used to indicate the flow of receiving data when a base station implements the paging monitoring method, as shown in FIG. 4:

S401, the base station receives a second extended discontinuous reception cycle sent by an AMF through an initial context setup request message and/or a path switch request acknowledge message; the second extended discontinuous reception cycle is applied to paging monitored by a terminal.

Wherein, the initial context request message is an initial context setup request message.

Correspondingly, the AMF sends a second extended discontinuous reception cycle to the base station through an initial context setup request message and/or a path switch request acknowledge message; the second extended discontinuous reception cycle is used for the terminal to monitor the paging.

In some embodiments, the initial context setup request message and/or the path switch request acknowledge message is also used to transmit a device identification and/or a window length of a PTW to the base station.

In summary, the solution provided in the embodiment of the present disclosure determines the eDRX cycle configured by the radio access network RAN and monitors paging based on the eDRX cycle when the terminal is in the RRC inactive state. In the RRC inactive state, the monitoring target of the terminal includes CN paging as well as RAN paging when the terminal monitors the paging. In the above solutions, the terminal monitors RAN paging and/or CN paging based on a same extended discontinuous reception cycle. When the terminal is in the RRC inactive state, the overlap of the terminal's monitoring timing to RAN paging and CN paging is improved, the terminal's monitoring time to paging is reduced, and the terminal's resource consumption is reduced.

Referring to FIG. 5, FIG. 5 is a flow chart of a paging monitoring method provided in some exemplary embodiments of the present disclosure. The paging monitoring method is used to indicate the flow of sending data when the AMF implements the paging monitoring method, as shown in FIG. 5.

S501, the AMF sends a second extended discontinuous reception cycle to a base station through an initial context setup request message and/or a path switch request acknowledge message; the second extended discontinuous reception cycle is applied to a paging monitoring by a terminal.

Correspondingly, the base station receives the second extended discontinuous reception cycle sent by the AMF through the initial context setup request message and/or the path switch request acknowledge message; the second extended discontinuous reception cycle is used for the terminal to monitor the paging.

In some embodiments, the initial context setup request message and/or the path switch request acknowledge message is also used to transmit a device identification and/or a window length of a PTW to the base station.

In summary, the solution provided in the embodiment of the present disclosure determines the eDRX cycle configured by the radio access network RAN and monitors paging based on the eDRX cycle when the terminal is in the RRC inactive state. In the RRC inactive state, the monitoring target of the terminal includes CN paging as well as RAN paging when the terminal monitors the paging. In the above solutions, the terminal monitors RAN paging and/or CN paging based on a same extended discontinuous reception cycle. When the terminal is in the RRC inactive state, the overlap of the terminal's monitoring timing to RAN paging and CN paging is improved, the terminal's monitoring time to paging is reduced, and the terminal's resource consumption is reduced.

Referring to FIG. 6, FIG. 6 is a flow chart of a paging monitoring method provided in some exemplary embodiments of the present disclosure, as shown in FIG. 6.

S601, the AMF synchronizes configuration information to the base station through the AMF via an initial context setup request message and/or a path switch request acknowledge message. Among them, the configuration information includes the UE_ID_H, $T_{eDRX,H}$ and PTW window length L of the UE.

To assist the gNB to use the same UE_ID_H, $T_{eDRX,H}$ and PTW window length Las the CN paging, the AMF needs to inform the gNB about these parameters. For example, the information may be carried through the initial context setup request message, specifically, by extending the Core Network Assistance Information for RRC INACTIVE to implement.

After that, the UE triggers the RRC resume process under the new gNB. If the old anchor gNB decides to transmit the UE context to the new gNB, the new gNB will acquire the UE's UE_ID_H, $T_{eDRX,H}$, PTW window length L, and other information from AMF through the path switch request acknowledge message.

S602, the base station sends configuration information to the terminal. When the CN configured eDRX cycle is larger than 10.24S, CN paging needs to use H-SFN and PTW solutions. After receiving the CN eDRX cycle $T_{eDRX,H}$ configured by CN, the base station sends the CN eDRX cycle down to the terminal via downlink signaling (e.g. RRC signaling).

For CN paging eDRX, if PTW and PH are to be used under the CN eDRX cycle configuration, the PH and PTW are calculated as follows:

S603, determine PH;

PH is an H-SFN satisfying the following condition:

$$H\text{-}SFN \bmod T_{eDRX,H}=(UE\_ID\_H \bmod T_{eDRX,H});$$

wherein the UE_ID_H is based on a Hash; $T_{eDRX,H}$ is an eDRX cycle in a hyper frame, configured by AMF.

S604, determine PTW;

PTW_start is the starting radio frame number of the PTW, which is also an SFN satisfying the following conditions:

$$SFN=266*i_{eDRX},$$

$i_{eDRX}$=floor (UE_ID_H/$T_{eDRX,H}$) mod 4, $T_{eDRX,H}$ is an eDRX cycle in a hyper frame, configured by the AMF;

PTW_end is the ending radio frame number of the PTW, which is also an SFN satisfying the following conditions:

$$SFN=(PTW\_\text{start}+L*100-1)\text{mod } 1024,$$

where L is the window length of the PTW, configured by the AMF.

At this time, the terminal acquires the starting radio frame number and the ending radio frame number of the PTW, that is, the terminal acquires the PTW configured by the eDRX, the terminal may page CN paging in the PTW, and the CN paging cycle configured by the CN is used as the monitoring cycle for paging monitoring the CN paging in the PTW.

For CN paging eDRX, if PTW and PH are to be used under the CN eDRX cycle configuration, the PH and PTW are calculated as follows:

PH is an H-SFN satisfying the following condition:

$$H\text{-}SFN \bmod T_{eDRX,H,RAN}=(UE\_ID\_H \bmod T_{eDRX,H,RAN});$$

wherein the UE_ID_H is based on a Hash; $T_{eDRX,H,RAN}$ is an eDRX cycle in a hyper frame, configured by gNB.

PTW_start is the starting radio frame number of the PTW, which is also an SFN satisfying the following conditions:

$$SFN=266*i_{eDRX};$$

$i_{eDRX}$=floor (UE_ID_H/$T_{eDRX,H,RAN}$) mod 4, $T_{eDRX,H,RAN}$ is an eDRX cycle in a hyper frame, configured by the AMF;

PTW_end is the ending radio frame number of the PTW, which is also an SFN satisfying the following conditions:

$$SFN=(PTW\_\text{start}+L*100-1)\text{mod } 1024,$$

where L is the window length of the PTW, configured by the AMF.

S605, determining the DRX cycle in the PTW; monitoring the paging according to the DRX cycle.

At this time, the terminal acquires the starting radio frame number and the ending radio frame number of the PTW, that is, the terminal acquires the PTW configured by the eDRX, the terminal may page RAN paging in the PTW, and the RAN paging cycle configured by the gNB is used as the monitoring cycle for paging monitoring the RAN paging in the PTW.

When the terminal is in the RRC_INACTIVE state and the PTW of RAN paging and CN paging overlap, if the UE uses the RAN paging cycle (if configured by the gNB RRC) during the overlap PTW time, the minimum of the UE specific DRX (if configured by the higher level) and default paging cycle will be set as the DRX cycle to monitor paging; otherwise, in the PTW of RAN paging, the UE uses the RAN paging cycle to monitor paging; in the PTW of CN paging, the UE uses the minimum of the UE specific DRX (if configured at a high level) and default paging cycle as the DRX cycle to monitor paging.

Figure 7:
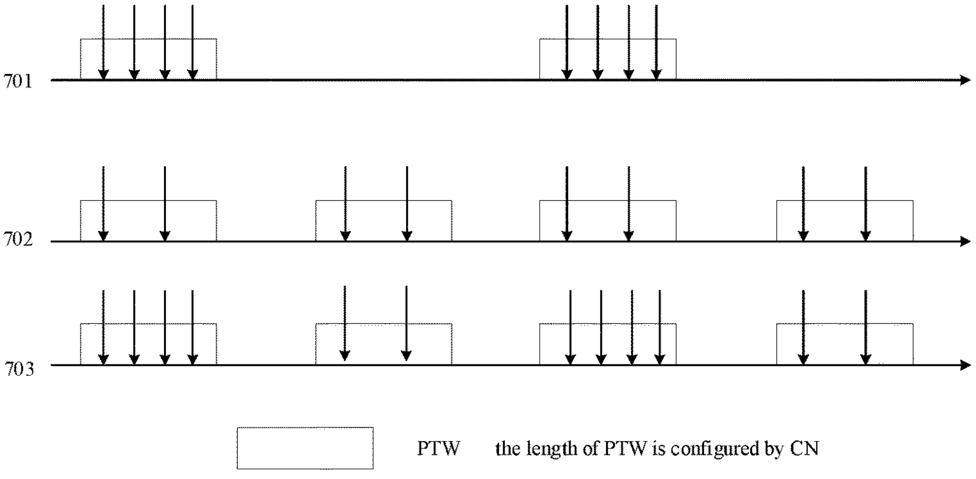
FIG. 7 is a schematic view of a paging monitoring timing frame provided in some embodiment illustrated in FIG. 6.

FIG. 7 is a schematic view of a paging monitoring timing frame provided in some embodiment illustrated in FIG. 6. As shown in FIG. 7, 701 is a timing frame schematic of the terminal paging and monitoring to the CN according to the eDRX cycle configured by the CN.

702 is a timing frame schematic of the terminal paging monitoring the access network RAN according to the RAN configured eDRX cycle. When the RAN configured eDRX cycle is greater than 10.24S, the RAN paging needs to use the H-SFN and PTW solution, and the base station will send RAN paging cycle and RAN eDRX cycle (T eDRX,H,RAN) configured by RAN to the terminal through the downlink signaling (e.g., RRC signaling).

703 is a timing frame schematic of the terminal paging monitoring paging according to the solution provided in the embodiment shown in FIG. 6. For example, if the RAN eDRX cycle is smaller than the CN eDRX cycle, when the paging occasion is in the overlap part of the corresponding PTW of the RAN and the corresponding PTW of the CN, the UE uses the minimum of the RAN paging cycle (if the gNB RRC is configured), the UE specific DRX (if configured at the high level) and the default paging cycle as the DRX cycle to monitor paging; in the PTW of CN paging, the UE uses the minimum of UE specific DRX (if configured at the high level) and default paging cycle as the DRX cycle to monitor paging.

Figure 8:
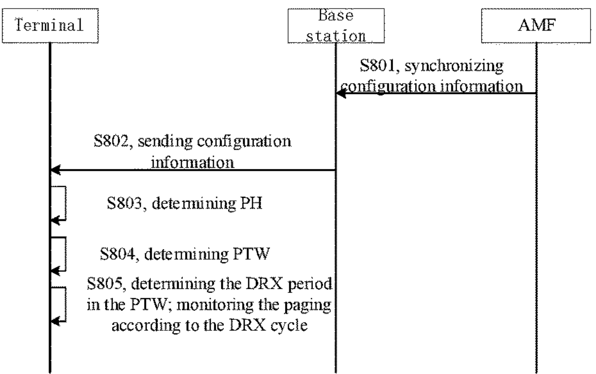
FIG. 8 is a flow chart of a paging monitoring method provided in some exemplary embodiments of the present disclosure.

Referring to FIG. 8, FIG. 8 is a flow chart of a paging monitoring method provided in some exemplary embodiments of the present disclosure. As shown in FIG. 8:

S801, the AMF synchronizes configuration information to the base station through the AMF via an initial context setup request message and/or a path switch request acknowledge message. Among them, the configuration information includes the UE_ID_H information of the UE.

For the gNB to acquire the UE_ID_H, the AMF needs to notify the gNB. For example, the information may be carried through the initial context setup request message, specifically, by extending the Core Network Assistance Information for RRC INACTIVE to implement.

After that, the UE triggers the RRC resume process under the new gNB. If the old anchor gNB decides to transmit the UE context to the new gNB, the new gNB will acquire the UE's UE_ID_H from AMF through the path switch request acknowledge message.

S802, the base station sends configuration information to the terminal. When the CN configured eDRX cycle is smaller than 10.24S, CN paging, CN paging does not need to use H-SFN and PTW solution. After receiving the eDRX cycle configured by CN, the UE uses the minimum of UE specific DRX (if configured at the high level) and default paging cycle as the DRX cycle to monitor CN paging; if the CN is configured eDRX cycle, the UE uses eDRX cycle configured by the higher level as the DRX cycle to monitor CN paging.

For RAN paging eDRX, if PTW and PH are to be used under the RAN eDRX cycle configuration, the PH and PTW are calculated as follows:

S803, determine PH;

PH is an H-SFN satisfying the following condition:

$$H\text{-}SFN \bmod T_{eDRX,H,RAN}=(UE\_ID\_H \bmod T_{eDRX,H,RAN});$$

wherein the UE_ID_H is based on a Hash; $T_{eDRX,H}$ is an eDRX cycle in a hyper frame, configured by gNB.

S804, determine PTW;

PTW_start is the starting radio frame number of the PTW, which is also an SFN satisfying the following conditions:

$$SFN=256*i\_eDRX$$

$$i_{eDRX}=\text{floor}(UE\_ID\_H/T_{eDRX,H,RAN})\bmod 4$$

PTW_end is the ending radio frame number of the PTW, which is also an SFN satisfying the following conditions:

$$SFN=(PTW\_start+L1*100-1)\bmod 1024,$$

where L1 is the window length of the PTW, configured by the gNB. The condition that the gNB configures the window length of the PTW is that the CN does not configure the window length of the PTW.

S805, determining the DRX cycle in the PTW; monitoring the paging according to the DRX cycle.

At this time, the terminal acquires the starting radio frame number and the ending radio frame number of the PTW, that is, the terminal acquires the PTW configured by the eDRX, the terminal may page RAN paging in the PTW, and the RAN paging cycle configured by the gNB is used as the monitoring cycle for paging monitoring the RAN paging in the PTW.

During the PTW of RAN paging eDRX, the UE uses the minimum of RAN paging cycle (if configured by gNB RRC), UE specific DRX (if configured at the high level), and default paging cycle as the DRX cycle to monitor paging; outside the PTW of RAN paging eDRX, if the CN is not configured with eDRX cycle, the UE will use the UE specific DRX (if configured at the high level) and the minimum of the default paging cycle as the DRX cycle to monitor paging; if the CN is configured with eDRX cycle, the UE will use the eDRX cycle configured at the high level as the DRX cycle to monitor paging.

Figure 9:
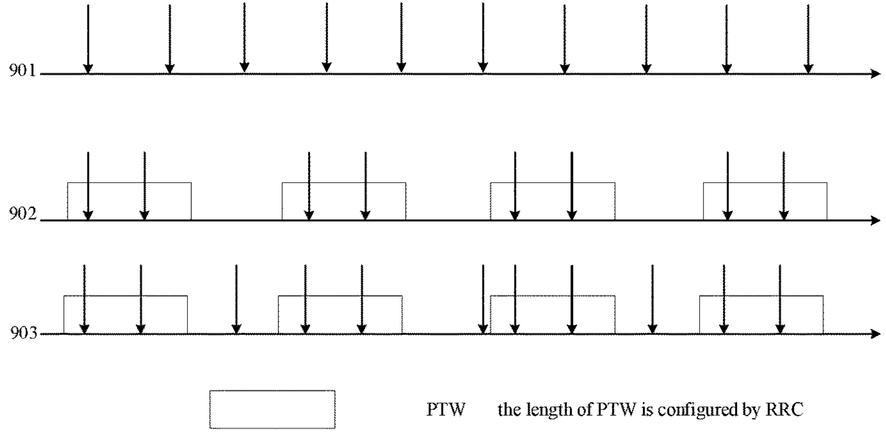
FIG. 9 is a schematic view of a paging monitoring timing frame provided in some embodiment illustrated in FIG. 8.

Referring to FIG. 9, 901 is the timing frame schematic of the terminal paging the CN according to the eDRX cycle configured by the CN.

902 is a timing frame schematic of the terminal paging monitoring the access network RAN according to the RAN configured eDRX cycle. When the RAN configured eDRX cycle is greater than 10.24S, the RAN paging needs to use the H-SFN and PTW solution, and the base station will send RAN paging cycle and RAN eDRX cycle (T eDRX,H,RAN) configured by RAN to the terminal through the downlink signaling (e.g., RRC signaling).

903 is a schematic diagram of the timing frame for paging monitoring to paging as determined by the terminal according to the scheme provided in the embodiment shown in FIG. 8. During the PTW of RAN paging eDRX, the UE uses the minimum of RAN paging cycle (if configured by gNB RRC), UE specific DRX (if configured at the high level), and default paging cycle as the DRX cycle to monitor paging; outside the PTW of RAN paging eDRX, if the CN is not configured with eDRX cycle, the UE will use the UE specific DRX (if configured at the high level) and the minimum of the default paging cycle as the DRX cycle to monitor paging; if the CN is configured with eDRX cycle, the UE will use the eDRX cycle configured at the high level as the DRX cycle to monitor paging.

The following is an embodiment of an apparatus in the present disclosure, which may be used to perform the method in some embodiments of the present disclosure. For details not disclosed in the embodiment of the apparatus, please refer to the embodiments of the method.

Figure 10:
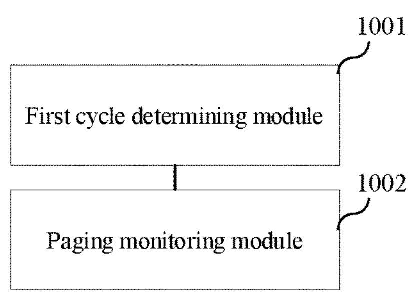
FIG. 10 is a block diagram of a paging monitoring apparatus provided in some embodiments of the present disclosure.

Referring to FIG. 10, FIG. 10 is a block diagram of a paging monitoring apparatus provided in some embodiments of the present disclosure. The apparatus is applied to a terminal, which has the function to implement the paging monitoring method mentioned above. As shown in FIG. 10, the apparatus includes:

a first cycle determining module 1001, configured to determine a first extended discontinuous reception cycle configured by a radio access network, RAN, in response to the terminal in an radio resource control, RRC, inactive state, wherein the first extended discontinuous reception cycle is configured to monitor a RAN paging and/or a CN paging;

a paging monitoring module 1002, configured to monitor paging based on the first extended discontinuous reception cycle.

In some embodiments, the paging monitoring module 1002 includes:

a first H-SFN determining sub-module, configured to determine a first H-SFN based on the first extended discontinuous reception cycle;

a first paging monitoring sub-module, configured to monitor the paging based on the first H-SFN.

In some embodiments, the paging monitoring module 1002 includes:

- a second cycle determining sub-module, configured to determine a second extended discontinuous reception cycle configured by an AMF;
- a second H-SFN determining sub-module, configured to determine a second H-SFN based on the second extended discontinuous reception cycle;
- wherein the first paging monitoring sub-module is configured to monitor the paging based on the first H-SFN and the second H-SFN.

In some embodiments, the first paging monitoring sub-module includes:

- a first monitoring cycle determining unit, configured to determine a first paging monitoring cycle corresponding to a first paging occasion based on the first H-SFN and the second H-SFN;
- a first monitoring unit, configured to monitor the paging based on the first paging monitoring cycle corresponding to the first paging occasion.

In some embodiments, the first monitoring cycle determining unit is configured to determine the first paging monitoring cycle based on at least one of a RAN paging cycle, a device characteristic cycle, and a default paging cycle, in response to the first H-SFN and the second H-SFN both including the first paging occasion.

In some embodiments, the first monitoring cycle determining unit is further configured to determine the first paging monitoring cycle based on the minimum of at least one of a RAN paging cycle, a device characteristic cycle, and a default paging cycle, in response to the first H-SFN and the second H-SFN both including the first paging occasion.

In some embodiments, the first monitoring cycle determining unit is further configured to determine a RAN paging cycle as the first paging monitoring cycle, in response to the first H-SFN including the first paging occasion and the second H-SFN excluding the first paging occasion.

In some embodiments, the first paging monitoring sub-module further includes:

- a first timing window determining unit, configured to determine a first PTW based on the second extended discontinuous reception cycle;
- the first monitoring unit, configured to monitor the paging in the first PTW based on the first paging monitoring cycle.

In some embodiments, the first timing window determining unit includes:

- a first window length acquiring sub-unit, configured to determine a window length of the first PTW configured by the AMF;
- a first starting frame number determining sub-unit, configured to determine a starting radio frame number of the first PTW based on the second extended discontinuous reception cycle;
- a first ending frame number determining sub-unit, configured to determine an ending radio frame number of the first PTW based on the starting radio frame number of the first PTW and the window length of the first PTW.

In some embodiments, the first starting frame number determining sub-unit is configured to determine the starting radio frame number of the first PTW based on the second extended discontinuous reception cycle and a device identification corresponding to the terminal.

In some embodiments, the first monitoring cycle determining unit is configured to determine a device characteristic cycle and a default paging cycle as the first paging monitoring cycle, in response to the first H-SFN excluding the first paging occasion and the second H-SFN including the first paging occasion.

In some embodiments, the first paging monitoring sub-module further includes:

- a second timing window determining unit, configured to determine a second PTW based on the second extended discontinuous reception cycle;
- the first monitoring unit, configured to monitor the paging in the second PTW based on the first paging monitoring cycle.

In some embodiments, the second timing window determining unit includes:

- a second window length acquiring sub-unit, configured to determine a window length of the second PTW configured by the AMF;
- a second starting frame number determining sub-unit, configured to determine a starting radio frame number of the second PTW based on the second extended discontinuous reception cycle;
- a second ending frame number determining sub-unit, configured to determine an ending radio frame number of the second PTW based on the starting radio frame number of the second PTW and the window length of the second PTW.

In some embodiments, the second starting frame number determining sub-unit is configured to determine the starting radio frame number of the second PTW based on the second extended discontinuous reception cycle and a device identification corresponding to the terminal.

In some embodiments, the paging monitoring module includes:

- a third timing window determining sub-module, configured to determine a third PTW based on the first extended discontinuous reception cycle;
- a second paging monitoring sub-module, configured to monitor the paging based on the first H-SFN and the third PTW.

In some embodiments, the second paging monitoring sub-module includes:

- a second monitoring cycle determining unit, configured to determine a second paging monitoring cycle corresponding to a second paging occasion based on the first H-SFN and the third PTW;
- a first monitoring unit, configured to monitor the paging based on the second paging monitoring cycle.

In some embodiments, the second monitoring cycle determining unit is configured to determine the second paging monitoring cycle based on at least one of a RAN paging cycle, a device characteristic cycle, and a default paging cycle, in response to the first H-SFN and the third PTW both including the second paging occasion.

In some embodiments, the second monitoring cycle determining unit is configured to determine, the second paging monitoring cycle based on the minimum of at least one of a RAN paging cycle, a device characteristic cycle, and a default paging cycle, in response to the first H-SFN and the third PTW both including the second paging occasion.

In some embodiments, the third timing window determining sub-module includes:

- a third window length acquiring unit, configured to obtain, a window length of the third PTW configured by a base station;
- a third starting frame number determining unit, configured to determine a starting radio frame number of the third PTW based on the first extended discontinuous reception cycle;

a third ending frame number determining unit, configured to determine an ending radio frame number of the third PTW based on the starting radio frame number of the third PTW and the window length of the third PTW.

In some embodiments, the third starting frame number determining unit is configured to determine the starting radio frame number of the third PTW based on the first extended discontinuous reception cycle and a device identification corresponding to the terminal.

In some embodiments, the second monitoring cycle determining unit is configured to determine the second extended discontinuous reception cycle as the second paging monitoring cycle, in response to at least one of the first H-SFN and the third PTW excluding the second paging occasion and the second extended discontinuous reception cycle configured by the AMF less than a cycle threshold.

In some embodiments, the second monitoring cycle determining unit is configured to determine the second paging monitoring cycle based on at least one of a device characteristic cycle and a default paging cycle, in response to at least one of the first H-SFN and the third PTW excluding the second paging occasion and the second extended discontinuous reception cycle not configured by the AMF.

In some embodiments, the second monitoring cycle determining unit is configured to determine the second paging monitoring cycle based on the minimum of at least one of a device characteristic cycle and a default paging cycle, in response to at least one of the first H-SFN and the third PTW excluding the second paging occasion and the second extended discontinuous reception cycle not configured by the AMF.

In summary, based on the solution provided in the embodiments of the present disclosure, the eDRX cycle configured by a radio access network RAN is determined, and the paging is monitored based on the eDRX cycle, when the terminal is in the RRC inactive state. When the terminal monitors the paging in the RRC inactive state, the monitoring targets include CN paging and RAN paging. With the above solution, the terminal monitors RAN paging and/or CN paging based on the same extended discontinuous reception cycle. When the terminal is in the RRC inactive state, the overlap of the terminal's monitoring timing to RAN paging and CN paging is improved, the terminal's monitoring time of paging is reduced, and the terminal's resource consumption is reduced.

Figure 11:
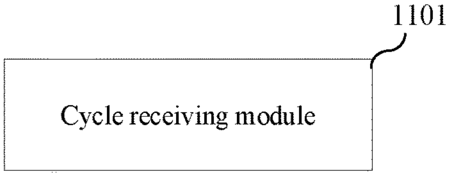
FIG. 11 is a block diagram of a paging monitoring apparatus provided in some embodiments of the present disclosure.

Referring to FIG. 11, FIG. 11 is a block diagram of a paging monitoring apparatus provided in some embodiments of the present disclosure. The apparatus is applied to a base station, which has the function to implement the paging monitoring method mentioned above. As shown in FIG. 11, the apparatus includes:

In some embodiments, the apparatus is applied to a base station, including:

a cycle receiving module, configured to receive a second extended discontinuous reception cycle sent by an AMF through an initial context setup request message and/or a path switch request acknowledge message; the second extended discontinuous reception cycle is applied to paging monitored by a terminal.

In some embodiments, the initial context setup request message and/or the path switch request acknowledge message is further applied to transmitting a device identification and/or a window length of a PTW to the base station.

In some embodiments, the device is applied to an AMF including:

a cycle sending module, configured to send a second extended discontinuous reception cycle to a base station through an initial context setup request message and/or a path switch request acknowledge message; the second extended discontinuous reception cycle is applied to a paging monitoring by a terminal.

In some embodiments, the initial context setup request message and/or the path switch request acknowledge message is further applied to transmitting a device identification and/or a window length of a PTW to the base station.

In summary, based on the solution provided in the embodiments of the present disclosure, the eDRX cycle configured by a radio access network RAN is determined, and the paging is monitored based on the eDRX cycle, when the terminal is in the RRC inactive state. When the terminal monitors the paging in the RRC inactive state, the monitoring targets include CN paging and RAN paging. With the above solution, the terminal monitors RAN paging and/or CN paging based on the same extended discontinuous reception cycle. When the terminal is in the RRC inactive state, the overlap of the terminal's monitoring timing to RAN paging and CN paging is improved, the terminal's monitoring time of paging is reduced, and the terminal's resource consumption is reduced.

Figure 12:
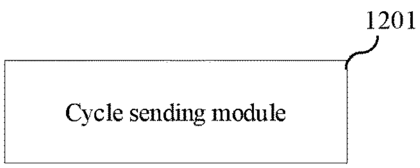
FIG. 12 is a block diagram of a paging monitoring apparatus provided in some embodiments of the present disclosure.

Referring to FIG. 12, FIG. 12 is a block diagram of a paging monitoring apparatus provided in some embodiments of the present disclosure. The apparatus is applied to an AMF which has the function to implement the paging monitoring method mentioned above. As shown in FIG. 12, the apparatus includes:

a cycle sending module, configured to send a second extended discontinuous reception cycle to a base station through an initial context setup request message and/or a path switch request acknowledge message; the second extended discontinuous reception cycle is applied to a paging monitoring by a terminal.

In some embodiments, the initial context setup request message and/or the path switch request acknowledge message is further applied to transmitting a device identification and/or a window length of a PTW to the base station.

In summary, based on the solution provided in the embodiments of the present disclosure, the eDRX cycle configured by a radio access network RAN is determined, and the paging is monitored based on the eDRX cycle, when the terminal is in the RRC inactive state. When the terminal monitors the paging in the RRC inactive state, the monitoring targets include CN paging and RAN paging. With the above solution, the terminal monitors RAN paging and/or CN paging based on the same extended discontinuous reception cycle. When the terminal is in the RRC inactive state, the overlap of the terminal's monitoring timing to RAN paging and CN paging is improved, the terminal's monitoring time of paging is reduced, and the terminal's resource consumption is reduced.

It should be noted that when the apparatus provided in the above-mentioned embodiments implement their functions, only the above-mentioned division of each functional module is regarded as an example for explanation. In actual application, the above-mentioned functions may be assigned by different functional modules to complete according to the actual requirements to complete, to complete all or part of the described functions above.

Regarding the apparatus in the above embodiments, the specific way in which each module performs its operation has been described in detail in the embodiment about the method, and will not be described in detail here.

Figure 13:
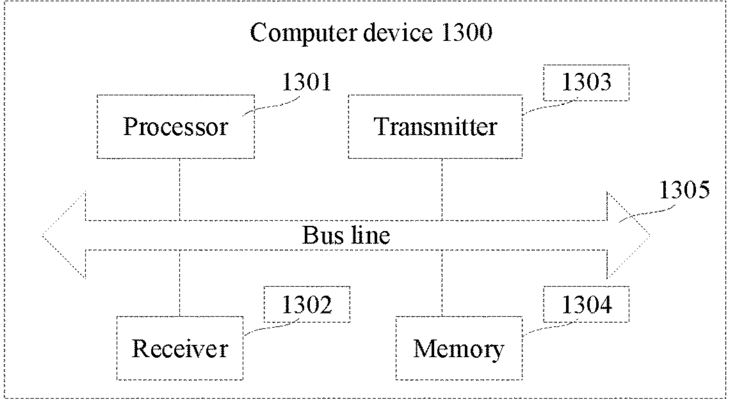
FIG. 13 is a block diagram of a computer device provided in some embodiments of the present disclosure.

Referring to FIG. 13, FIG. 13 is a block diagram of a computer device 1300 provided in some embodiments of the present disclosure. The computer device 1300 may include a processor 1301, a receiver 1302, a transmitter 1303, a memory 1304, and a bus line 1305.

The processor 1301 includes one or more processing cores, and the processor 1301 performs various functional applications and information processing, thereby executing software programs and modules.

Receiver 1302 and transmitter 1303 may be implemented as one communication component, which may be a communication chip. The communication chip may also be called a transceiver.

Memory 1304 is connected to processor 1301 via bus 1305.

The memory 1304 may be used to store a computer program, and the processor 1301 is used to execute the computer program to implement the various steps performed by the server-side device, configuration device, cloud platform, or account server in the method of the embodiments described above.

In addition, memory 1304 may be implemented by any type of volatile or non-volatile storage device or a combination thereof. Volatile or non-volatile storage devices include but are not limited to disk or optical disk, electrically erasable programmable read-only memory, erasable programmable read-only memory, static anytime access memory, read-only memory, magnetic memory, flash memory, and programmable read-only memory.

In some embodiments, the computer device includes a processor, a memory, and a transceiver. The transceiver may include receiver and transmitter, wherein the receiver is applied to receiving information, and the transmitter is applied to sending information.

In some embodiments, when the computer device is a terminal, the terminal includes a processor, a memory, and a transceiver, wherein:

- the processor is configured to determine the first extended discontinuous reception cycle configured by a radio access network, RAN, in response to the terminal in an inactive radio resource control, RRC, state; the first extended discontinuous reception cycle is configured to monitor a RAN paging and/or a CN paging;
- the transceiver is configured to monitor paging based on the first extended discontinuous reception cycle.

In some embodiments, when the computer device is a base station, the terminal includes a processor, a memory, and a transceiver, wherein:

- the transceiver is configured to receive a second extended discontinuous reception cycle sent by an AMF through an initial context setup request message and/or a path switch request acknowledge message;
- the second extended discontinuous reception cycle is applied to paging monitoring by a terminal.

In some embodiments, when the computer device is an AMF includes a processor, a memory, and a transceiver, wherein:

- the transceiver is configured to send a second extended discontinuous reception cycle to a base station through an initial context setup request message and/or a path switch request acknowledge message;
- the second extended discontinuous reception cycle is applied to paging monitoring by a terminal.

The processor and transceiver in the embodiments of the present disclosure may perform the steps performed by the terminal in any one of the paging monitoring methods mentioned in FIGS. 2-5, and will not be repeated herein.

The embodiments of the present disclosure provide a computer readable storage medium, wherein a computer program is stored in the storage medium. The computer program is configured to be executed by a processor to implement steps of the paging monitoring method mentioned in any one of FIGS. 2-4.

The present disclosure also provides a computer program product or computer program. The computer program product or computer program includes computer instructions. The computer instructions are stored in a computer readable storage medium. A processor of the computer device reads the computer instructions from the computer readable storage medium. The processor executes the computer instructions such that the computer device performs each of the steps in the paging monitoring method mentioned in any of FIGS. 2-5.

The skills in the art should be aware that in one or more of the above examples, the functions described in the embodiments of the present disclosure may be implemented with hardware, software, firmware, or any combination thereof. When implemented using software, these functions may be stored in a computer readable medium or transmitted as one or more instructions or code on a computer readable medium. Computer readable media includes computer storage media and communication media, whereas communication media includes any media that facilitates the transmission of computer programs from one place to another. The storage medium may be any available medium accessible to a general-purpose or specialized computer.

The foregoing are only exemplary embodiments of the present disclosure and are not intended to limit the present disclosure. Any modifications, equivalent replacements, improvements, etc. made within the spirit and principles of the present disclosure shall be included within the scope of protection of the present application.

What is claimed is:

1. A paging monitoring method, applied to a terminal, comprising:

- determining a first extended discontinuous reception (eDRX) cycle configured by radio access network (RAN) and a second eDRX cycle in response to the terminal being in a radio resource control (RRC) inactive state, wherein the first eDRX cycle is configured to monitor RAN paging and/or core network (CN) paging;
- determining a first hyper system frame number (H-SFN) based on the first eDRX cycle;
- determining a second H-SFN based on the second eDRX cycle; and
- monitoring paging based on the first eDRX cycle first H-SFN and the second H-SFN.

2. The method as claimed in claim 1, wherein the monitoring the paging based on the first H-SFN and the second H-SFN comprises:

- determining a first paging monitoring cycle corresponding to a first paging occasion based on the first H-SFN and the second H-SFN;
- monitoring the paging based on the first paging monitoring cycle corresponding to the first paging occasion.

3. The method as claimed in claim 2, wherein the determining a first paging monitoring cycle corresponding to a first paging occasion based on the first H-SFN and the second H-SFN comprises:

- determining the first paging monitoring cycle based on at least one of a RAN paging cycle, a device characteristic cycle, and a default paging cycle, in response to the first H-SFN and the second H-SFN both comprising the first paging occasion.

4. The method as claimed in claim 3, wherein the determining the first paging monitoring cycle based on at least one of a RAN paging cycle, a device characteristic cycle, and a default paging cycle, in response to the first H-SFN and the second H-SFN both comprising the first paging occasion comprises:

determining the first paging monitoring cycle based on the minimum of at least one of a RAN paging cycle, a device characteristic cycle, and a default paging cycle, in response to the first H-SFN and the second H-SFN both comprising the first paging occasion.

5. The method as claimed in claim 3, further comprising:

determining a RAN paging cycle as the first paging monitoring cycle, in response to the first H-SFN comprising the first paging occasion and the second H-SFN excluding the first paging occasion.

6. The method as claimed in claim 3, wherein before the monitoring the paging based on the first paging monitoring cycle corresponding to the first paging occasion, the method comprises:

determining a first paging timing window (PTW) based on the second eDRX cycle;

wherein the monitoring the paging based on the first paging monitoring cycle corresponding to the first paging occasion comprises:

monitoring the paging in the first PTW based on the first paging monitoring cycle.

7. The method as claimed in claim 6, wherein determining a first PTW based on the second eDRX cycle comprises:

determining a window length of the first PTW configured by an access and mobility management function (AMF) or the RAN;

determining a starting radio frame number of the first PTW based on the second eDRX cycle;

determining an ending radio frame number of the first PTW based on the starting radio frame number of the first PTW and the window length of the first PTW.

8. The method as claimed in claim 7, wherein the determining a starting radio frame number of the first PTW based on the second eDRX cycle comprises:

determining the starting radio frame number of the first PTW based on the second eDRX cycle and a device identification corresponding to the terminal.

9. The method as claimed in claim 3, further comprising:

determining a minimum of at least one of a device characteristic cycle and a default paging cycle as the first paging monitoring cycle, in response to the first H-SFN excluding the first paging occasion and the second H-SFN comprising the first paging occasion.

10. The method as claimed in claim 9, wherein before the monitoring the paging based on the first paging monitoring cycle corresponding to the first paging occasion, the method comprises:

determining a second PTW based on the second eDRX cycle;

wherein the monitoring the paging based on the first paging monitoring cycle corresponding to the first paging occasion comprises:

monitoring the paging in the second PTW based on the first paging monitoring cycle.

11. A terminal, comprising a processor, a memory, and a transceiver, wherein the memory is configured to store a computer program and the processor is configured to invoke the computer program stored in the memory to cause the terminal to perform:

determining a first extended discontinuous reception (eDRX) cycle configured by radio access network (RAN) and a second eDRX cycle in response to the terminal being in a radio resource control (RRC) inactive state; the first eDRX cycle is configured to monitor RAN paging and/or core network (CN) paging;

determining a first hyper system frame number (H-SFN) based on the first eDRX cycle;

determining a second H-SFN based on the second eDRX cycle; and monitoring paging based on the first eDRX cycle first H-SFN and the second H-SFN.

12. The terminal as claimed in claim 11, wherein the processor is further configured to invoke the computer program stored in the memory to cause the terminal to perform:

determining a first paging monitoring cycle corresponding to a first paging occasion based on the first H-SFN and the second H-SFN;

monitoring the paging based on the first paging monitoring cycle corresponding to the first paging occasion.

13. The terminal as claimed in claim 12, wherein the processor is further configured to invoke the computer program stored in the memory to cause the terminal to perform:

determining the first paging monitoring cycle based on at least one of a RAN paging cycle, a device characteristic cycle, and a default paging cycle, in response to the first H-SFN and the second H-SFN both comprising the first paging occasion.

14. The terminal as claimed in claim 13, wherein the processor is further configured to invoke the computer program stored in the memory to cause the terminal to perform:

determining the first paging monitoring cycle based on the minimum of at least one of a RAN paging cycle, a device characteristic cycle, and a default paging cycle, in response to the first H-SFN and the second H-SFN both comprising the first paging occasion.

15. The terminal as claimed in claim 13, wherein the processor is further configured to invoke the computer program stored in the memory to cause the terminal to perform:

determining a RAN paging cycle as the first paging monitoring cycle, in response to the first H-SFN comprising the first paging occasion and the second H-SFN excluding the first paging occasion.

16. The terminal as claimed in claim 13, wherein before the monitoring the paging based on the first paging monitoring cycle corresponding to the first paging occasion, the processor is further configured to invoke the computer program stored in the memory to cause the terminal to perform:

determining a first paging timing window (PTW) based on the second eDRX cycle;

wherein the monitoring the paging based on the first paging monitoring cycle corresponding to the first paging occasion comprises:

monitoring the paging in the first PTW based on the first paging monitoring cycle.

17. The terminal as claimed in claim 16, wherein the processor is further configured to invoke the computer program stored in the memory to cause the terminal to perform:

determining a window length of the first PTW configured by an access and mobility management function (AMF) or the RAN;

determining a starting radio frame number of the first PTW based on the second eDRX cycle;

determining an ending radio frame number of the first PTW based on the starting radio frame number of the first PTW and the window length of the first PTW.

18. The terminal as claimed in claim 17, wherein the processor is further configured to invoke the computer program stored in the memory to cause the terminal to perform:

determining the starting radio frame number of the first PTW based on the second eDRX cycle and a device identification corresponding to the terminal.

19. The terminal as claimed in claim 13, wherein the processor is further configured to invoke the computer program stored in the memory to cause the terminal to perform:

determining a minimum of at least one of a device characteristic cycle and a default paging cycle as the first paging monitoring cycle, in response to the first H-SFN excluding the first paging occasion and the second H-SFN comprising the first paging occasion.

20. The terminal as claimed in claim 19, wherein before the monitoring the paging based on the first paging monitoring cycle corresponding to the first paging occasion, the processor is further configured to invoke the computer program stored in the memory to cause the terminal to perform:

determining a second PTW based on the second eDRX cycle;

wherein the processor is further configured to invoke the computer program stored in the memory to cause the terminal to perform:

monitoring the paging in the second PTW based on the first paging monitoring cycle.

* * * * *